United States Patent
Bowyer et al.

(10) Patent No.: US 9,797,376 B2
(45) Date of Patent: Oct. 24, 2017

(54) FLOATING WIND TURBINE SAFETY SYSTEM

(71) Applicant: MHI VESTAS OFFSHORE WIND, Aarhus N (DK)

(72) Inventors: Robert Bowyer, London (GB); Ian Couchman, London (GB)

(73) Assignee: MHI VESTAS OFFSHORE WIND, Aarhus N (DK)

( * ) Notice: Subject to any disclaimer, the term of this patent is extended or adjusted under 35 U.S.C. 154(b) by 326 days.

(21) Appl. No.: 14/419,638

(22) PCT Filed: Jul. 30, 2013

(86) PCT No.: PCT/DK2013/050255
§ 371 (c)(1),
(2) Date: Feb. 4, 2015

(87) PCT Pub. No.: WO2014/023313
PCT Pub. Date: Feb. 13, 2014

(65) Prior Publication Data
US 2015/0211488 A1 Jul. 30, 2015

Related U.S. Application Data (60) Provisional application No. 61/680,287, filed on Aug. 7, 2012.

(30) Foreign Application Priority Data

Aug. 7, 2012 (DK) .................................. 2012 70466

(51) Int. Cl.
*G05D 3/12* (2006.01)
*F03D 7/04* (2006.01)
(Continued)

(52) U.S. Cl.
CPC .............. *F03D 7/042* (2013.01); *B63B 39/00* (2013.01); *B63B 39/03* (2013.01); *F03D 7/02* (2013.01);
(Continued)

(58) Field of Classification Search
CPC .......... F03D 7/042; F03D 9/257; F03D 13/25; F03D 7/02; Y02E 10/727; Y02E 10/723; F05B 2240/93
See application file for complete search history.

(56) References Cited

U.S. PATENT DOCUMENTS

2010/0003134 A1  1/2010  Edwards et al.
2010/0209247 A1  8/2010  Becker et al.
(Continued)

FOREIGN PATENT DOCUMENTS

EP   2107236 A1   10/2009
JP   2005271673 A  10/2005
WO   2012069578 A1  5/2012

OTHER PUBLICATIONS

Control strategies for operation of pitch regulated turbines above cut-out wind speeds. Article. [online]. Larsen, 2009 [retrieved on Feb. 18, 2017]. Retrieved from internet: <URL: http://orbit.dtu.dk/files/3742155/2009_21.pdf>.*
(Continued)

*Primary Examiner* — Robert Fennema
*Assistant Examiner* — Marzia T Monty
(74) *Attorney, Agent, or Firm* — Patterson + Sheridan, LLP (57) ABSTRACT

The present invention relates to methods and apparatus for operating a safety system in a floating wind turbine. The floating wind turbine comprises one or more sensors 202, 203, and receives a fore-aft inclination signal from the sensor 202, wherein the fore-aft inclination signal indicates
(Continued)

an inclination of said floating wind turbine in a fore-aft direction. A side-to-side inclination signal is also received from the sensor 203, wherein the side-to-side inclination signal indicates an inclination of said floating wind turbine in a side-to-side direction. An operational parameter of the floating wind turbine is altered based on either or both of said fore-aft inclination signal and said side-to-side inclination signal.

11 Claims, 2 Drawing Sheets

(51) Int. Cl.
| | | |
|---|---|---|
| *F03D 7/02* | (2006.01) |
| *F03D 13/25* | (2016.01) |
| *F03D 9/25* | (2016.01) |
| *B63B 39/03* | (2006.01) |
| *B63B 39/00* | (2006.01) |
| *B63B 35/44* | (2006.01) |

(52) U.S. Cl.
CPC ............ *F03D 9/257* (2017.02); *F03D 13/25* (2016.05); *B63B 2035/446* (2013.01); *F05B 2240/93* (2013.01); *Y02E 10/723* (2013.01); *Y02E 10/727* (2013.01)

(56) References Cited

U.S. PATENT DOCUMENTS

| | | |
|---|---|---|
| 2011/0037264 A1 | 2/2011 | Roddier et al. |
| 2011/0140420 A1 | 6/2011 | Loh et al. |
| 2012/0051888 A1 | 3/2012 | Mizoue et al. |

OTHER PUBLICATIONS

International Search Report for PCT/DK2013/050255, Oct. 28, 2013.
Danish Search Report for PA 2012 70466, Mar. 22, 2013.

* cited by examiner

FLOATING WIND TURBINE SAFETY SYSTEM

The present invention relates to a wind turbine safety system and, in particular, to a floating wind turbine safety system.

Wind turbines which effectively harness wind energy to generate electrical power are becoming increasingly popular as an alternative energy source to the traditional methods for generating electrical power. In order to generate a suitable magnitude of electrical power wind turbines are often co-located together in large groups referred to as wind power plants. A wind power plant may vary in size from tens of wind turbines up to hundreds of wind turbines or even thousands in the future.

Traditionally, wind power plants have been located on land in areas where the available wind energy is suitable for consistent electrical power generation. However, as more wind farms are being erected then there are fewer suitable locations available on land which provide suitable wind flow (for example, wind flow not being affected by hills, woods, building, and so on) to enable a consistent level of electrical power generation.

As such, there is now a move towards locating wind farms offshore, for example, in the ocean, in the sea, in lakes and so on. This has several advantages in that the wind flow is usually uninterrupted as they are away from populated areas and obstructions.

Currently, wind turbines are very large and heavy structures which require stable foundations. This is typically not a problem for wind turbines located on land but provides a challenge for wind turbines that are located offshore.

In shallow water each wind turbine may be mounted on or have foundations in the sea bed though, logistically, mounting the turbines to the sea bed is only possible in relatively shallow water, for example, up to water depths of 30 meters. However, water depths up to 30 meters are generally close to the shore and the majority of offshore locations that are located close to large cities, the sea bed tends to drop off to depths of >100 m very quickly e.g. east coast of America.

Therefore there is a desire to be able to float wind turbines further offshore where mounting the wind turbine on the sea bed is not viable or in locations closer to shore where providing foundations in the sea bed is not possible.

As such, there is a move towards mounting wind turbines on floating platforms.

The floating wind turbine will be subject to various forces acting on it, for example, the wind, additional forces on startup of the wind turbine, waves and the motion of the water, and so on. It is critical that a floating wind turbine is kept substantially upright and within safety tolerances. The floating platform typically has mechanisms for monitoring the motion of the platform to ensure that the platform motion is within safety tolerances.

However, the inventors have identified a need to incorporate safety control systems into the turbine itself either to work independently of, or in cooperation with the platform safety systems.

The present invention seeks to address, at least in part, some or all of the needs and disadvantages described hereinabove.

According to a first aspect of the present invention there is provided a method for operating a safety system in a floating wind turbine wherein the floating wind turbine comprises one or more sensors, and the method comprises the steps of: receiving a fore-aft inclination signal from the sensor, wherein the fore-aft inclination signal indicates an inclination of the floating wind turbine in a fore-aft direction; receiving a side-to-side inclination signal from the sensor, wherein the side-to-side inclination signal indicates an inclination of the floating wind turbine in a side-to-side direction; and altering an operational parameter of the floating wind turbine based on either or both of the fore-aft inclination signal and the side-to-side inclination signal.

The present invention therefore advantageously enables a safety system to be implemented in a floating wind turbine where the operating parameters of the wind turbine are altered based on the inclination of the wind turbine. The one or more sensors may be any sensor(s), e.g. a roll sensor and/or a tilt sensor, that can measure the inclination of the wind turbine and may be separate devices for that purpose or combined with, or part of, other devices such as a Light Detecting and Ranging (LiDAR) device.

The method may be implemented in hardware, software or any combination thereof. The method may be implemented by one or more controllers in the floating wind turbine.

For a wind turbine, the fore-aft direction may be considered as the forwards/backwards direction along the line from the front of the nacelle (on which a hub and blades are mounted) to the rear of the nacelle. Therefore, as the nacelle yaws then the fore-aft direction follows the nacelle so that it is always considered as the forwards/backwards direction in relation to the front of the nacelle.

The side-to-side direction may be considered as the direction perpendicular to the fore-aft direction and again, as the nacelle yaws, the side-to-side direction follows the nacelle.

The method may further comprise the steps of comparing the fore-aft inclination signal and/or the side-to-side inclination signal to a predefined threshold; and altering the operational parameter of the floating wind turbine if the fore-aft inclination signal and/or the side-to-side inclination signal is greater than the predefined threshold.

Thus, the inclination of the wind turbine in the fore-aft direction and/or the side-to-side direction may be compared to a predefined threshold to determine whether to alter the operating parameters of the wind turbine. The predefined threshold may be the prescribed safety limit for the floating wind turbine. The threshold may be an angle from the vertical or horizontal planes.

The method may further comprise the steps of determining an overall inclination signal for the floating wind turbine based on the fore-aft inclination signal and the side-to-side inclination signal; comparing the overall inclination signal for the floating wind turbine to a predefined threshold; and altering the operational parameter of the floating wind turbine if the overall inclination signal is greater than the predefined threshold.

Therefore, the method may determine an overall inclination value for the wind turbine by combining or evaluating both the fore-aft inclination signal and the side-to-side inclination signal. The overall inclination of the wind turbine may then be compared with a predefined threshold to determine whether to alter the operating parameters of the wind turbine. The predefined threshold may be the prescribed safety limit for the floating wind turbine. The threshold may be an angle from the vertical or horizontal planes.

The predefined threshold may also define a boundary shape for the inclination of the wind turbine. For example, the boundary may define an ellipsoidal shape as the motion of the wind turbine may reflect or correspond to an ellipsoid path. Therefore, the inclination may be compared to the defined boundary to determine whether the wind turbine is inclining greater than prescribed safety limits.

The predefined threshold may be altered based on the conditions, forces, and so on, that affect the wind turbine at its location and may be based, for example, on one or more of predicted data, models of the conditions, on historical data, on real data once the wind turbine has been deployed, and so on.

The method may further comprise the steps of altering the predefined threshold. The predefined threshold can be altered at any time depending on the conditions and forces acting on the wind turbine at its location, or due to seasonal variations. The predefined threshold may be automatically altered by the controller in the wind turbine. In this case, the controller may refer to a lookup table of predefined thresholds and conditions in order to select the appropriate predefined threshold automatically.

The method may further comprise the step of determining the predefined threshold based on one or more of predicted conditions affecting the floating wind turbine, actual conditions affecting the floating wind turbine and historical conditions affecting the floating wind turbine.

The step of altering the operational parameter of the floating wind turbine further includes the step of initiating a shutdown of the floating wind turbine.

Accordingly, if the inclination of the wind turbine is greater than the predefined threshold then operational parameters of the wind turbine may be altered which may include initiating a shutdown of the wind turbine for safety reasons to prevent the wind turbine from inclining further and ultimately tipping over. Additionally or alternatively, other operating parameters of the wind turbine may be altered to counter the inclination of the wind turbine, for example, altering the pitch of turbine blades via a pitch control system to reduce the loads/forces on the wind turbine, to alter the direction of the nacelle via a yaw control system to reduce the loads/forces on the wind turbine, and so on.

The sensor may comprise a first inclinometer and a first accelerometer, and the method may comprise the steps of receiving a first inclination signal from the first inclinometer wherein the inclination signal indicates an inclination of the floating wind turbine in the fore-aft direction; receiving a first acceleration signal from the first accelerometer wherein the acceleration signal indicates an acceleration of the floating wind turbine in the fore-aft direction; and determining the fore-aft inclination signal based on the received first inclination signal and the first acceleration signal.

The sensor may be a tilt sensor or other sensor for determining the inclination in the fore-aft direction. The sensor may comprise an inclinometer and an accelerometer. An inclination signal may be received from the inclinometer which indicates the inclination of the floating wind turbine in the fore-aft direction. The inclination is an indication as the floating wind turbine may not be stationary or moving at a constant velocity due to the forces and motion acting on the floating wind turbine. Therefore the inclination measured by the inclinometer may be a theoretical inclination. In order to take into account the forces and motions acting on the floating wind turbine then an acceleration signal is received from the accelerometer in relation to the acceleration in the fore-aft direction. The fore-aft inclination signal, which corresponds to the real inclination of the floating wind turbine in the fore-aft direction (or a good approximation thereof), can then be determined based on the received inclination signal and acceleration signal in the fore-aft directions.

The sensor may further comprise a second inclinometer and a second accelerometer, and the method may comprise the steps of receiving a second inclination signal from the second inclinometer wherein the inclination signal indicates an inclination of the floating wind turbine in the side-to-side direction; receiving a second acceleration signal from the second accelerometer wherein the acceleration signal indicates an acceleration of the floating wind turbine in the side-to-side direction; and determining the side-to-side inclination signal based on the received second inclination signal and the second acceleration signal.

The sensor may be a roll sensor or other sensor for determining the inclination in the side-to-side direction. The sensor may comprise an inclinometer and an accelerometer. An inclination signal may be received from the inclinometer which indicates the inclination of the floating wind turbine in the side-to-side direction. The inclination is an indication as the floating wind turbine may not be stationary or moving at a constant velocity due to the forces and motion acting on the floating wind turbine. Therefore the inclination measured by the inclinometer may be a considered a theoretical inclination. In order to take into account the forces and motions acting on the floating wind turbine then an acceleration signal is received from the accelerometer in relation to the acceleration in the side-to-side direction. The side-to-side inclination signal, which corresponds to the real inclination of the floating wind turbine in the side-to-side direction (or a good approximation thereof), can then be determined based on the received inclination signal and acceleration signal in the side-to-side directions.

The first and second inclinometer may be the same inclinometer or different inclinometers. Similarly, the first and second accelerometer may be the same or different accelerometers.

The step of determining the fore-aft inclination signal may further comprise the steps of multiplying the first acceleration signal by a constant gain; and subtracting the first acceleration signal multiplied by the constant gain from the first inclination signal.

The step of determining the side-to-side inclination signal may further comprise the steps of multiplying the second acceleration signal by a constant gain; and subtracting the second acceleration signal multiplied by the constant gain from the second inclination signal.

The acceleration signals may be multiplied by a constant gain in order to effectively tune the safety system to the requirements of the wind turbine at the location that it is to be deployed or located. This provides a significant advantage as the constant gain may be tuned based on the conditions, forces, and so on, that affect the wind turbine at its location and may be based, for example, on one or more of predicted data, models of the conditions, on historical data, on real data once the wind turbine has been deployed, and so on.

The method may further comprise the steps of tuning the constant gain. The constant gain can be fine-tuned and changed at any time depending on the conditions and forces acting on the wind turbine at its location, or due to seasonal variations. The constant gain may be automatically fine-tuned by the controller in the wind turbine. In this case, the controller may refer to a lookup table of constant gains and conditions in order to select the appropriate constant gain automatically.

The method may further comprise the step of determining the constant gain based on one or more of predicted conditions affecting the floating wind turbine, actual conditions affecting the floating wind turbine and historical conditions affecting the floating wind turbine.

The method may further comprise the steps of filtering one or more of the first inclination signal, the second inclination signal, the first acceleration signal, the second acceleration signal, the fore-aft inclination signal and the side-to-side inclination signal.

The signals in the safety system may be filtered by low pass filters and/or high pass filters in order to increase the accuracy of the safety system and/or reduce the effects of unwanted or unuseful components of the various signals. However, the use of filters may introduce a lag, or delay, into the process of determining the inclination of the floating wind turbine. As such, the design of the filters needs to be taken into account to ensure that the lag introduced by the filters is not detrimental to the safety system and the ability to shut down the wind turbine when the real inclination is above a threshold without a substantial delay.

The one or more sensors may further comprise a third accelerometer and the method may further comprise the steps of receiving a third acceleration signal where the third acceleration signal indicates the acceleration in the z-axis (or vertical plane); and determining the fore-aft inclination signal and/or the side-to-side inclination signal based on the third acceleration signal.

The acceleration in the z-axis may be small and of low frequency and therefore have a small effect on the accuracy and efficiency of the safety system. However, taking into account the acceleration in the z axis may be advantageous as the floating wind turbine will also be moving in the vertical plane due to the motion of the water on which the floating wind turbine is located. Thus, determining the inclination of the floating wind turbine based also on the acceleration in the vertical direction may improve the accuracy of the safety system The first, second and third accelerometers may be the same accelerometer, different accelerometers or any combination thereof. For example, if the accelerometer is a three axis accelerometer then an acceleration signal for each of the three axes may be provided by the accelerometer.

According to a second aspect of the present invention there is provided a floating wind turbine comprising: one or more sensors; a first processor adapted to receive a fore-aft inclination signal from the sensor, wherein the fore-aft inclination signal indicates an inclination of the floating wind turbine in a fore-aft direction; a second processor adapted to receive a side-to-side inclination signal from the sensor, wherein the side-to-side inclination signal indicates an inclination of the floating wind turbine in a side-to-side direction; and a third processor adapted to alter an operational parameter of the floating wind turbine based on either or both of the fore-aft inclination signal and the side-to-side inclination signal.

According to a third aspect of the present invention there is provided a floating wind turbine comprising means for receiving a fore-aft inclination signal from a sensor, wherein the fore-aft inclination signal indicates an inclination of the floating wind turbine in a fore-aft direction; receiving a side-to-side inclination signal from the sensor, wherein the side-to-side inclination signal indicates an inclination of the floating wind turbine in a side-to-side direction; and altering an operational parameter of the floating wind turbine based on either or both of the fore-aft inclination signal and the side-to-side inclination signal.

The means for implementing the present invention may be one or more controllers, one or more processors and may be software, hardware or any combination thereof.

The floating wind turbine may further comprise a fourth processor adapted to compare the fore-aft inclination signal and/or the side-to-side inclination signal to a predefined threshold; and the third processor is further adapted to alter the operational parameter of the floating wind turbine if the fore-aft inclination signal and/or the side-to-side inclination signal is greater than the predefined threshold.

The floating wind turbine may further comprise a fifth processor adapted to determine an overall inclination signal for the floating wind turbine based on the fore-aft inclination signal and the side-to-side inclination signal; a sixth processor adapted to compare the overall inclination signal for the floating wind turbine to a predefined threshold; and the third processor is further adapted to alter the operational parameter of the floating wind turbine if the overall inclination signal is greater than the predefined threshold.

The third processor may alter the operational parameter of the floating wind turbine by initiating a shutdown of the floating wind turbine.

The sensor may comprise a first inclinometer and a first accelerometer; and wherein the first processor may be further adapted to receive a first inclination signal from the first inclinometer wherein the inclination signal indicates an inclination of the floating wind turbine in the fore-aft direction; receive a first acceleration signal from the first accelerometer wherein the acceleration signal indicates an acceleration of the floating wind turbine in the fore-aft direction; and determine the fore-aft inclination signal based on the received first inclination signal and the first acceleration signal.

The sensor may further comprise a second inclinometer and a second accelerometer, and wherein the second processor may be further adapted to receive a second inclination signal from the second inclinometer wherein the inclination signal indicates an inclination of the floating wind turbine in the side-to-side direction; receive a second acceleration signal from the second accelerometer wherein the acceleration signal indicates an acceleration of the floating wind turbine in the side-to-side direction; and determine the side-to-side inclination signal based on the received second inclination signal and the second acceleration signal.

The first processor may be further adapted to multiply the first acceleration signal by a constant gain; and subtract the first acceleration signal multiplied by the constant gain from the first inclination signal.

The second processor may be further adapted to multiply the second acceleration signal by a constant gain; and subtract the second acceleration signal multiplied by the constant gain from the second inclination signal.

The floating wind turbine may further comprise a seventh processor adapted to determine the constant gain based on one or more of predicted conditions affecting the floating wind turbine, actual conditions affecting the floating wind turbine and historical conditions affecting the floating wind turbine.

The floating wind turbine may further comprise one or more filtering means adapted to filter one or more of the first inclination signal, the second inclination signal, the first acceleration signal, the second acceleration signal, the fore-aft inclination signal and the side-to-side inclination signal.

The one or more sensors may further comprise a third accelerometer and the floating wind turbine may further comprise an eighth processor adapted to receive a third acceleration signal where the third acceleration signal indicates the acceleration in the z-axis (or vertical plane); and the second processor and/or third processor may be further adapted to determine the fore-aft inclination signal and/or the side-to-side inclination signal respectively based on the third acceleration signal.

The first, second and third accelerometers may be the same accelerometer, different accelerometers or any combination thereof. For example, if the accelerometer is a three axis accelerometer then an acceleration signal for each of the three axes may be provided by the accelerometer.

The floating wind turbine may further comprise any means, apparatus, software or hardware, or any combination thereof, that may be adapted to implement any or all of the features, processes and functions of the method of the present invention.

The first processor through eighth processor may be the same processor, different processors or any combination thereof.

According to a fourth aspect of the present invention there is provided a computer program product comprising computer readable executable code for: receiving a fore-aft inclination signal from a sensor, wherein the fore-aft inclination signal indicates an inclination of the floating wind turbine in a fore-aft direction; receiving a side-to-side inclination signal from the sensor, wherein the side-to-side inclination signal indicates an inclination of the floating wind turbine in a side-to-side direction; and altering an operational parameter of the floating wind turbine based on either or both of the fore-aft inclination signal and the side-to-side inclination signal.

Embodiments of the present invention will now be described, by way of example only, and with reference to the accompanying drawings, in which.

Figure 1:
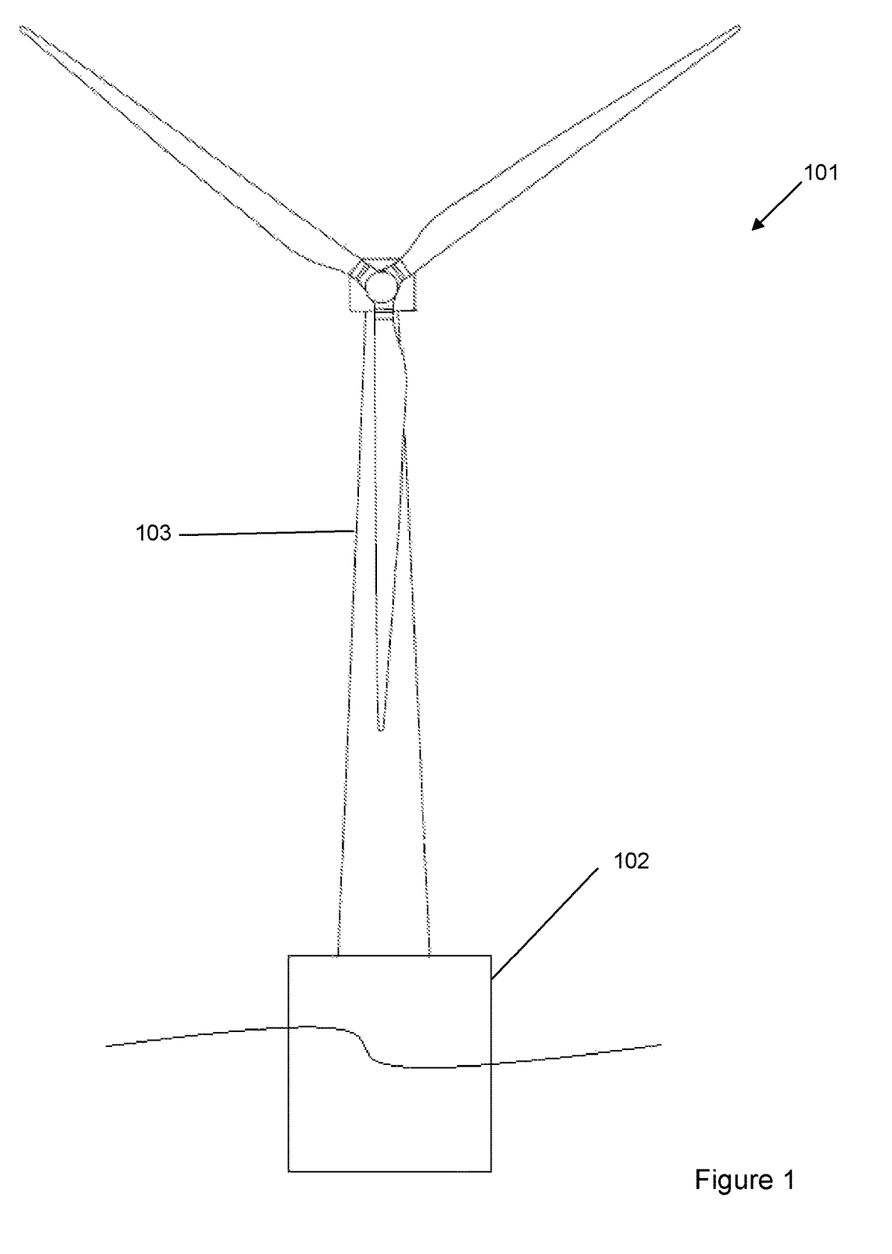
FIG. 1 shows a schematic diagram of a floating wind turbine.

With reference to FIG. 1, a floating wind turbine 101 may include, inter alia, a floating platform 102, and a wind turbine 103 located on the floating platform 102.

In FIG. 1, the floating platform 102 is shown simplified and generically as a box as there currently exist several designs of floating platforms and more may be designed in the future. The embodiments of the present invention may operate with any type or design of floating platform 102. For example, known floating platforms 102 may include a buoy type platform, interconnected buoyancy columns, and so on.

The floating platform 102 may include a safety system to ensure that the platform motion is within the required or defined safety limits. For example, the platform 102 may include sensors, some form of active ballast system, and so on. However, the response of the platform 102 in responding to the various forces acting on the platform may be slow. For example, in the case of an active balance system in the platform it may take in the region of 30 minutes for the ballast to be actively moved to counter forces acting on the platform. Furthermore, the safety tolerances (for example, in terms of inclination from the vertical) for a platform may be different to that of a wind turbine.

As such, there is a need for additional safety systems in the wind turbine, in addition to or in cooperation with any safety systems in the platform, so that the wind turbine is not dependent on the platform safety systems and may independently determine or identify that corrective measures are necessary, e.g. altering an operating condition of the wind turbine, in particular, initiate a shutdown of the wind turbine.

As discussed hereinabove, for a floating wind turbine 101 it would be beneficial to include one or more safety systems in the wind turbine (either separate to or in addition to any in the platform 102 of the floating wind turbine 101) to enable the wind turbine 103 to shutdown or alter its operating parameters if the wind turbine 103 is inclined past a safety limit.

The safety system includes a mechanism for determining the inclination of the wind turbine 103 in the fore-aft direction and side-to-side direction. For a wind turbine, the fore-aft direction is the forwards/backwards direction along the line from the front of the nacelle (on which a hub and blades are mounted) to the rear of the nacelle. Therefore, as the nacelle yaws then the fore-aft direction follows the nacelle so that it is always considered as the forwards/backwards direction.

The side-to-side direction is the direction perpendicular to the fore-aft direction and again, as the nacelle yaws, the side-to-side direction follows the nacelle.

As the wind turbine is floating on the water then the safety system should take into account the forces and motions (e.g. wave forces/motions, wind forces, operational forces, etc.) in order to determine or identify the real inclination of the floating wind turbine.

Figure 2:
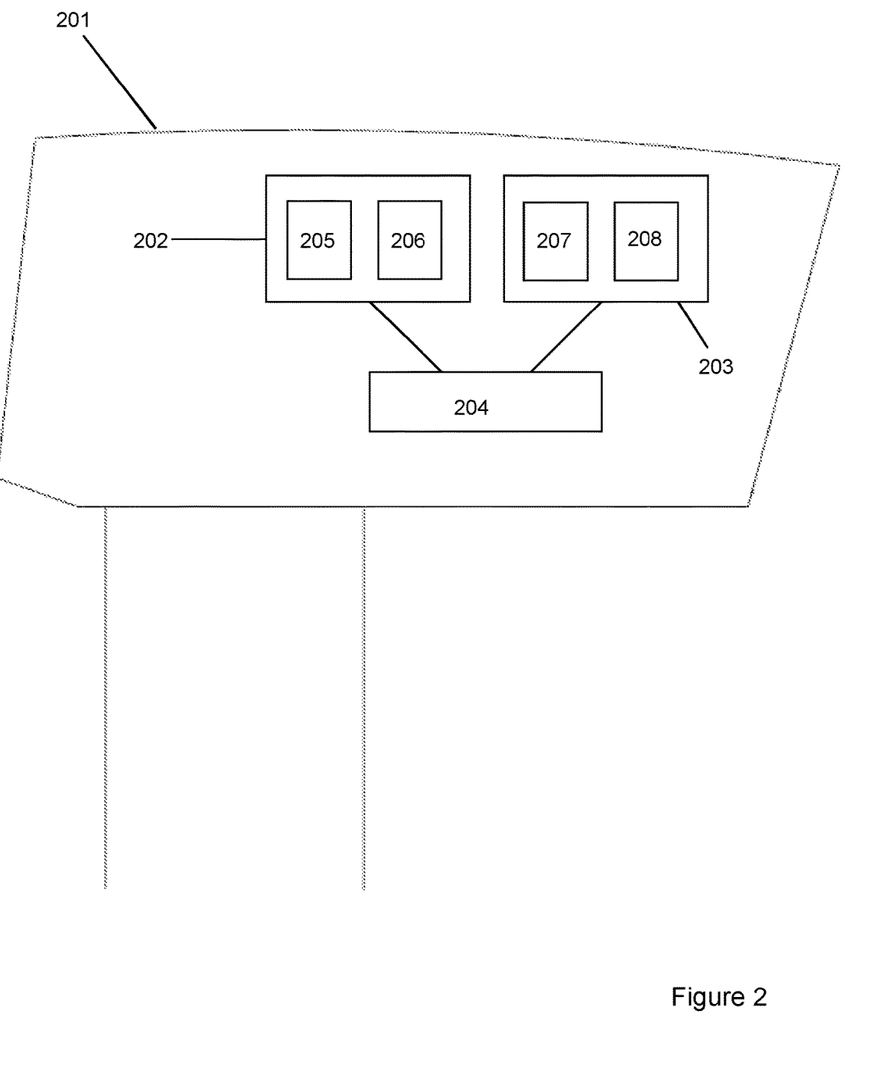
FIG. 2 shows a simplified schematic of a nacelle of a floating wind turbine in accordance with many of the embodiments of the present invention.

With reference to FIG. 2, which shows a simplified schematic of a nacelle 201 in accordance with many of the embodiments of the present invention, the nacelle 201 of the floating wind turbine includes one or more sensors, for example, a tilt sensor 202 and a roll sensor 203, which may be used to determine the inclination of the floating wind turbine in the fore-aft direction and the side-to-side direction, respectively.

There may be one sensor to measure the inclination in the fore-aft and side-to-side directions or set of sensors that enable the inclination of the wind turbine to be determined.

The real inclination in the fore-aft direction and the side-to-side direction (taking into account the forces acting on the wind turbine) may correspond to the fore-aft inclination signal and/or side-to-side inclination signal from the sensor(s) 202, 203 in the nacelle, or may require further processing of the fore-aft inclination signal and/or side-to-side inclination signal to take into consideration the forces and motion acting on the wind turbine (e.g. wave forces, wind forces, etc.).

The real inclination may then be used to determine or identify if a parameter of the wind turbine needs to be altered, for example, a shutdown of the wind turbine, for safety reasons. In particular, if the floating wind turbine is inclined from the vertical or the horizontal more than a predefined threshold then the wind turbine should be shut down for safety reasons or other operational parameters of the wind turbine altered (e.g. yaw control system, pitch control system, etc.).

The predefined threshold may be any suitable threshold for the purpose of the safety system of the present invention.

For example, the predefined threshold may be one threshold value for the inclination in the fore-aft direction (fore-aft inclination) and one threshold value for the inclination in the side-to-side direction (side-to-side inclination). Therefore, in this example, either the inclination from the vertical or horizontal in the fore-aft direction and/or in the side-to-side direction may be compared to a threshold value to determine whether the wind turbine should be shut down. There may be different threshold values for each of the directions or they may be the same threshold value. The threshold value may be an angle from the vertical or horizontal.

The threshold may be a single value, as in the example above, or may alternatively define a boundary, for example, an ellipsoidal shaped boundary. The inclination in the fore-aft direction may be combined or evaluated with the inclination in the side-to-side direction in order to determine a single combined value of the inclination of the wind turbine which may then be compared with the predefined ellipsoidal boundary in order to determine whether the wind turbine is inclined greater than permitted safety limits.

As will be appreciated, the predefined threshold(s) used to determine whether the wind turbine is inclining from the vertical or horizontal may be any suitable predefined thresholds which may be discrete values or define a shaped boundary.

The predefined threshold may be altered based on the conditions, forces, and so on, that affect the wind turbine at its location and may be based, for example, on one or more of predicted data, models of the conditions, on historical data, on real data once the wind turbine has been deployed, and so on.

The predefined threshold can be altered at any time depending on the conditions and forces acting on the wind turbine at its location, or due to seasonal variations. The predefined threshold may be automatically altered by the controller in the wind turbine. In this case, the controller may refer to a lookup table of predefined thresholds and conditions in order to select the appropriate predefined threshold automatically. The determination of the predefined threshold may additionally or alternatively be based on one or more of predicted conditions affecting the floating wind turbine, actual conditions affecting the floating wind turbine and historical conditions affecting the floating wind turbine.

A single inclination value (either the fore-aft inclination, side-to-side inclination or a combination thereof) may be compared with a threshold to determine if an inclination is greater than the threshold and the operating parameters of the wind turbine altered. However, in order to increase the efficiency and effectiveness of the safety system, it may additionally check that the inclination is greater than the threshold for a predetermined time period. As the embodiments are for a safety system then the predetermined time period may be, for example, 1 second, 2 seconds, 3 seconds and so on, preferably a time period that is short enough so that the correct action can be initiated should the wind turbine be inclining greater than prescribed safety limits but also long enough so that false measurements do not cause an action to be initiated, e.g. a shutdown, unnecessarily.

Accordingly, in many of the embodiments the inclination of the wind turbine may be determined from the one or more sensors, which in the following embodiments are tilt and/or roll sensors 202, 203 within the wind turbine. The measurements from the sensors may then be processed in order to identify whether the wind turbine should be shutdown, or other operating parameters altered, in the case that the wind turbine is inclined from the vertical (or horizontal) greater than is safe for the operation of the wind turbine.

The tilt sensor 202 and roll sensor 203 are preferably located in the nacelle of the wind turbine but may be located at any suitable position in the wind turbine for the purpose of the invention. Preferably, the tilt sensor and the roll sensor are located in line with the centre of the tower supporting the nacelle.

The tilt sensor 202 and roll sensor 203 may be implemented using various sensors that are suitable for the purpose of determining the real inclination of the wind turbine in the fore-aft direction and side-to-side direction whilst the wind turbine is floating on water and subject to various forces and motion.

However, as the implementation is for a safety system for a wind turbine the implementation should be robust and trusted. Therefore, in many of the embodiments the tilt sensor 202 and roll sensor 203 are implemented utilizing robust and trusted inclinometer(s) 206, 208 and accelerometer(s) 205, 207.

The nacelle 201 of a wind turbine includes a substantial amount of equipment, machinery, electronics, hydraulics, and so on, which is omitted from FIG. 2 for ease of reference and simplification.

The nacelle 201 includes, inter alia, a tilt sensor 202 that includes an accelerometer 205 and an inclinometer 206, a roll sensor 203 that includes an accelerometer 207 and an inclinometer 208, and at least one controller 204. The tilt sensor 202, roll sensor 203 and the at least one controller 204 form a safety system for the floating wind turbine.

In this example, the tilt sensor 202, the roll sensor 203 and the controller 204 are shown in the nacelle 201 of the wind turbine. However, as will be appreciated, the components of the safety system may be located in a tower of the wind turbine, in the hub of the wind turbine, or at any other position in the wind turbine suitable for the purpose of many of the embodiments of the present invention.

In these embodiments, the tilt sensor and the roll sensor may each comprise an inclinometer and an accelerometer. Alternatively, if a two axis (or three axis) accelerometer is implemented then a single accelerometer may be utilized to determine the inclination of the floating wind turbine in each of the two directions (fore-aft direction and side-to-side direction). Similarly, if an inclinometer can measure the inclination in two axes then a single inclinometer may be utilized to determine the inclination of the floating wind turbine in each of the two directions (fore-aft direction and side-to-side direction). Therefore, as will be appreciated, the tilt sensor and roll sensor may be comprised of separate inclinometers and accelerometers or may share either or both of the inclinometers and/or accelerometers.

With reference to FIG. 2, the operation of the tilt sensor 202 will now be described, where the tilt sensor 202 is utilized to determine a real inclination in the fore-aft direction (e.g. the real fore-aft inclination). As will be appreciated, the operation of the roll sensor 203 is substantially identical to that of the tilt sensor 202 but used to determine the real inclination in the side-to-side direction (e.g. the real side-to-side inclination).

The accelerometer 205 and the inclinometer 206 forming the tilt sensor 202 are preferably substantially co-located or located substantially close together and preferably in line with the centre of the tower supporting the nacelle. The controller 204 may be co-located or may be located any suitable position in the wind turbine, may be part of the wind turbine control system, located in a separate control box of the wind turbine or may be located away from the wind turbine, e.g. in a separate control centre.

Typically an inclinometer 206 measures the acceleration in two orthogonal directions and compares the direction of the net acceleration to a fixed axis in order to determine the inclination of the entity to which the inclinometer is attached. Typically, if the inclinometer sensor is stationary or moving at a constant velocity (and therefore the entity to which the inclinometer sensor is attached is stationary or moving at a constant velocity) then the angle between the determined net acceleration to the fixed axis corresponds to the inclination of the entity to which the inclinometer sensor is attached.

However, as the wind turbine will be subject to various motions and forces, e.g. wind forces, wave motion forces through the platform, wind turbine operational forces, and so on, then the wind turbine will not be substantially stationary or moving at a constant velocity. As such, the theoretical inclination in the fore-aft direction measured by the inclinometer 206 attached to the nacelle of the wind turbine would typically not correspond to the actual or real fore-aft inclination of the wind turbine from a substantially vertical position (or horizontal position) due to the motions and forces affecting the floating wind turbine.

In order to determine the real fore-aft inclination of the floating wind turbine, an accelerometer 205 is used in conjunction with the inclinometer 206 so that the controller 204 may to take into account the motion and forces acting on or affecting the wind turbine (and thereby affecting the inclinometer 206) in order to determine the real fore-aft inclination (or a good approximation thereof) of the wind turbine.

Preferably, the accelerometer 205 is positioned or located with or substantially close to the inclinometer 206 such that the acceleration in the fore-aft direction measured by the accelerometer 205 corresponds to the acceleration in the fore-aft direction affecting the inclinometer 206 measuring the inclination in fore-aft direction.

The controller 204 receives a fore-aft inclination signal from the inclinometer 206 where the fore-aft inclination signal includes the measurements of the inclination of the nacelle. The inclinometer 206 may be taking measurements of the fore-aft inclination at predefined time periods. For example, the inclinometer 206 may be taking inclination measurements every 100 milliseconds to 200 milliseconds. As will be appreciated, the time period between inclination measurements can be any suitable time period for the purpose of the invention. In particular, the inclination measurements should be taken to enable the real fore-aft inclination of the nacelle 201 to be determined by the controller 204 in substantially real-time or within a few seconds, e.g. 1 second, 2 seconds, 3 seconds, of the wind turbine reaching a particular inclination.

The fore-aft inclination signal from the inclinometer 206 may be filtered by the inclinometer 206 or by the controller 204. If the inclination signal is filtered, then the filter may be a low pass filter in order to reduce the effects of the tower motion on the inclination signal. The inclination signal may also not be filtered and in this example, an unfiltered fore-aft inclination signal is used by the controller 204.

As will be described hereinbelow, filters may be applied to various parts of the process in order to filter out components, reduce certain effects from the signal or to smooth signals in order to aid the determination or identification of the actual or real inclination of the nacelle of the wind turbine. However, as will be appreciated, each filter causes a lag in the process of determining the real inclination and as such there is a trade-off between filtering certain signals and determining the real inclination within a reasonable time frame of the nacelle reaching a particular inclination and the determination of that inclination.

The controller 204 may determine the theoretical fore-aft inclination of the wind turbine based on the measurements in the received fore-aft inclination signal or on a filtered version of the fore-aft inclination signal. However, as discussed hereinabove, as the wind turbine is not stationary or moving at a constant velocity the theoretical fore-aft inclination of the wind turbine is not the real fore-aft inclination due to the effects of the motion of the wind turbine, in particular, when the wind turbine is mounted on a floating platform.

Therefore, in many of the embodiments of the present invention the controller 204 further receives a fore-aft acceleration signal from an accelerometer 205. The fore-aft acceleration signal may include measurements of the acceleration of the nacelle where the acceleration measurements are taken at a predetermined time period. In this example, the predetermined time period may be 40 milliseconds but, as a person skilled in the art may appreciate, the frequency of taking accelerometer 205 measurements or data may be any suitable for the purpose of the invention.

In terms of determining the real fore-aft inclination (or a good approximation thereof) of the nacelle, the largest accelerations that affect the inclinometer 206 will be those resultant from the motion of the tower and are thus the largest contribution to the error of the inclination measurements taken by the inclinometer 206. As such, in this example, the received fore-aft acceleration signal may be filtered through a high pass filter in order to extract the acceleration attributed to the motion of the tower. The filtering therefore may be considered as removing or reducing the effects of acceleration of other factors, such as the platform, from the fore-aft acceleration signal received. The filtering may be performed by the accelerometer 205, the controller 204 or other circuitry.

As discussed hereinabove in respect of the fore-aft inclination signal from the inclinometer 206, filtering signals introduces a lag into the process and as such the filter for filtering the fore-aft acceleration signal may be omitted or included depending on the requirements. However, in this example, the fore-aft acceleration signal is filtered.

The filtered fore-aft acceleration signal may then be multiplied by a constant gain.

The choice of constant gain to multiply the filtered fore-aft acceleration signal effectively enables the safety system to be tuned to the requirements of the wind turbine at the location that it is to be deployed or located. This provides a significant advantage as the constant gain may be tuned based on the conditions, forces, and so on, that affect the wind turbine at its location and may be based, for example, on one or more of predicted data, models of the conditions, on historical data, on real data once the wind turbine has been deployed, and so on. Moreover, the constant gain value can be fine-tuned and changed during the life-time of the floating wind turbine depending on the conditions facing the floating wind turbine.

The choice of constant gain to use for a particular wind turbine represents a trade-off since a larger constant gain should provide a good approximation of the real inclination in high turbulence conditions and/or high wave conditions for a floating wind turbine whilst a lower gain should provide a good approximation of the real inclination in steady wind and/or negligible wave conditions.

The constant gain may be any suitable gain that enables the best approximation of the real inclination to be determined. It is envisaged that the constant gain will be between 1 and 5 depending on the conditions that the wind turbine is subject or expected to be subject to at the location at which the wind turbine will be deployed. The constant gain can be fine-tuned and changed at any time depending on the conditions and forces acting on the wind turbine at its location, or due to seasonal variations. The constant gain may be automatically fine-tuned by the controller in the wind turbine. In this case, the controller may refer to a lookup table of constant gains and conditions in order to select the appropriate constant gain automatically.

The real fore-aft inclination (or a good approximation thereof) can be determined by the controller 204 by subtracting the received filtered fore-aft acceleration signal (that has been multiplied by the selected constant gain) from the received fore-aft inclination signal.

The real fore-aft inclination signal determined may then be subjected to a filter, for example, a low pass filter in order to smooth the real fore-aft inclination signal. However, as will be appreciated, filtering of the real fore-aft inclination signal is optional due to similar reasons as discussed hereinabove where a filter introduces a lag into the process. In this example, the real fore-aft inclination signal is filtered in order to smooth the signal to improve the accuracy of the safety system. By filtering the real fore-aft inclination signal the number of false triggers can be reduced making the safety system more robust and efficient.

The real fore-aft inclination signal corresponds to the real fore-aft inclination of the nacelle of the wind turbine from the vertical enabling the controller 204 to compare the real fore-aft inclination with a threshold to identify whether the nacelle of the wind turbine is inclining from the vertical in the fore-aft direction at an angle greater than a predefined safety limit. If the comparison of the resulting signal and the threshold indicates that the nacelle is inclining greater than the predefined safety limit in the fore-aft direction, for example 12 degrees from the vertical (although as will be appreciated the predefined safety limit may be any suitable for the safety of the wind turbine), then the controller 204 may initiate or trigger a safety shutdown of the wind turbine, may raise an alarm and/or may alter the operational parameters of the wind turbine, e.g. alter the pitch of the turbine blades to reduce the load/forces on the wind turbine which may be causing the wind turbine to incline.

The controller may further compare several subsequent and continuous real fore-aft inclinations with the threshold so that it can be determined that the wind turbine is inclined greater than the threshold for a predetermined period of time. The predetermined period of time may be, 1 second, 2 seconds, 3 seconds, and so on. The predetermined period of time should be long enough to ensure that the wind turbine is inclining and not a false measurement but short enough to ensure that the appropriate corrective action(s) can be taken if the wind turbine is inclining greater than the prescribed safety limits.

The controller 204 may maintain or keep a log of the real fore-aft inclination of the nacelle or provide the information to an external system so that the real fore-aft inclination data may be analysed to ensure that the safety system is operating optimally and efficiently. The log may also be used to analyse whether the constant gain can or should be fine-tuned.

In the above description, the real fore-aft inclination was determined and compared to a threshold. In order to be a complete safety system, the real side-to-side inclination should also be determined and compared with a threshold.

The side-to-side inclination in many of the embodiments is measured via a roll sensor 203 which comprises an inclinometer 208 and an accelerometer 207. The real side-to-side inclination may be determined and compared to a threshold in a substantially identical manner to that described above for the determination of the real fore-aft inclination and so will not be repeated for simplicity.

Accordingly, the embodiments of the present invention describe a safety system that enables the real inclination of a wind turbine, especially a floating wind turbine, to be determined in order to identify whether the inclination of the wind turbine exceeds a threshold, where the threshold may be the angle at which it is deemed unsafe to continue operation and the wind turbine is instructed to shut down.

The safety system advantageously determines a real inclination of the wind turbine (taking into account the motions and forces acting on the wind turbine) by utilizing tilt sensor(s) and roll sensor(s) and identifies whether the wind turbine needs to be shutdown by comparing the real inclination(s) with a threshold. Moreover, many of the embodiments advantageously take advantage of using two robust, well-tested and relatively cost effective sensors (e.g. an inclinometer and an accelerometer) to implement the tilt sensor and roll sensor in order to produce a robust and effective safety system.

In the above described embodiments, the real inclination in the fore-aft direction and the side-to-side direction are determined and individually compared to threshold(s) to identify whether the real inclination in either or both directions is greater than a permitted safety limits. Alternatively or additionally, the real inclination in the two directions may be combined to produce a single overall real inclination of the wind turbine which may then be compared to a threshold (which may be a discrete value or define a boundary such as an ellipsoidal boundary).

In many of the embodiments, where accelerometer(s) form part of, or may be provided in addition to, the roll/tilt sensors the accelerometer(s) may further measure the acceleration in the vertical or z axis direction and the determination of the real inclination (in the fore-aft direction and the side-to-side direction) of the wind turbine may also be based on the acceleration measurements in the vertical direction. The acceleration in the z-axis will typically be small and of low frequency and therefore have a small effect on the accuracy and efficiency of the safety system. However, taking into account the acceleration in the z axis may be advantageous as the floating wind turbine will also be moving in the vertical plane due to the motion of the water on which the floating wind turbine is located. Thus, determining the real inclination based also on the acceleration in the vertical direction may improve the accuracy of the safety system but is an optional addition to the processing requirements, where it is important to ensure that the real inclination (or a good approximation thereof) is determined substantially in real time or within a few seconds of the turbine reaching the given inclination.

In many of the embodiments described hereinabove, the determination of the real inclination (or a good approximation thereof) in the fore-aft and side-to-side directions of the nacelle of the wind turbine is utilized as a safety system. In other words, the real inclination determination is used to identify whether the wind turbine should be shut down as the inclination from the vertical has become too large and beyond set safety limits. However, as will be appreciated, the determination of the real inclination could be utilized in the control of the wind turbine, for example, to alter an operating parameter (e.g. a pitch control system) in order to counter the inclination. Alternatively or additionally, the real inclination may be used to provide an input to the platform in the case that the platform incorporates an active ballast system to initiate a transfer of ballast to counter the inclination of the wind turbine.

Another advantage of many of the embodiments of the present invention is the ability to tune the safety sensor so that it can work in all conditions and provide the optimal safety system for the location that the wind turbine is deployed. The safety system may be tuned by changing the constant gain that is multiplied with the acceleration signal in the fore-aft and side-to-side directions. Based on any combination of historical, predicted, modeled and live data the safety system may be optimized and tuned by altering the constant gain value for each individual floating wind turbine or group of co-located floating wind turbines.

As the embodiments primarily relate to a safety system then it is preferable that the real inclination is determined substantially in real time or at least within a predefined period of time after that inclination is reached. For example, the predefined period of time may be less than 1 second, 1, 2 seconds, 3 seconds, and so on.

As will be appreciated by a person skilled in the art, filtering techniques may be applied to none, some or all of the signals and appropriate filters may be utilized depending on the function and use of the filter. As described hereinabove, the use of filters introduces a lag into the process of determining the real inclination of the wind turbine.

As such, the design of the filters needs to be taken into account to ensure that the lag introduced by the filters is not detrimental to the safety system and the ability to shut down the wind turbine when the real inclination is above a threshold without a substantial delay.

Filters applied to the various signals in many of the embodiments may be used to improve the accuracy of the determination of the real inclination; however, the use of filters is only preferable as an approximation of the real inclination can be determined without such filters. Depending on the design and implementation of the filters (so as to not produce a detrimental lag in the safety system) any combination of the signals may be filtered in order to improve the accuracy of the determination of the real inclination of the floating wind turbine.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method for operating a safety system in a floating wind turbine wherein said floating wind turbine comprises one or more sensors, and said method comprising:
   receiving a fore-aft inclination signal from said one or more sensors, wherein said fore-aft inclination signal indicates an inclination of said floating wind turbine in a fore-aft direction, wherein said one or more sensors comprise a first inclinometer and a first accelerometer, and said method further comprising:
      receiving a first inclination signal from said first inclinometer wherein said first inclination signal indicates the inclination of the floating wind turbine in said fore-aft direction;
      receiving a first acceleration signal from said first accelerometer wherein said first acceleration signal indicates an acceleration of said floating wind turbine in said fore-aft direction; and
      determining said fore-aft inclination signal based on said received first inclination signal and said first acceleration signal by:
         multiplying said first acceleration signal by a first constant gain; and
         subtracting said first acceleration signal multiplied by said first constant gain from said first inclination signal;
   receiving a side-to-side inclination signal from said one or more sensors, wherein said side-to-side inclination signal indicates an inclination of said floating wind turbine in a side-to-side direction, wherein said one or more sensors comprise a second inclinometer and a second accelerometer, and said method further comprising:
      receiving a second inclination signal from said second inclinometer wherein said second inclination signal indicates an inclination of the floating wind turbine in said side-to-side direction;
      receiving a second acceleration signal from said second accelerometer wherein said second acceleration signal indicates an acceleration of said floating wind turbine in said side-to-side direction; and
      determining said side-to-side inclination signal based on said received second inclination signal and said second acceleration signal by:
         multiplying said second acceleration signal by a second constant gain; and
         subtracting said second acceleration signal multiplied by said second constant gain from said second inclination signal; and
   altering an operational parameter of said floating wind turbine based on either or both of said fore-aft inclination signal and said side-to-side inclination signal.

2. The method as claimed in claim 1 further comprising:
   comparing said fore-aft inclination signal and/or said side-to-side inclination signal to a predefined threshold; and
   altering said operational parameter of said floating wind turbine if said fore-aft inclination signal and/or said side-to-side inclination signal is greater than said predefined threshold.

3. The method as claimed in claim 1 further comprising:
   determining an overall inclination signal for said floating wind turbine based on said fore-aft inclination signal and said side-to-side inclination signal;
   comparing said overall inclination signal for said floating wind turbine to a predefined threshold; and
   altering said operational parameter of said floating wind turbine if said overall inclination signal is greater than said predefined threshold.

4. The method as claimed in claim 1 in which altering said operational parameter of said floating wind turbine further includes:
   initiating a shutdown of said floating wind turbine.

5. The method as claimed in claim 1 further comprising:
   determining said first and second constant gains based on one or more of predicted conditions affecting said floating wind turbine, actual conditions affecting said floating wind turbine and historical conditions affecting said floating wind turbine.

6. A floating wind turbine comprising:
   one or more sensors;
   a first processor adapted to receive a fore-aft inclination signal from said one or more sensors, wherein said fore-aft inclination signal indicates an inclination of said floating wind turbine in a fore-aft direction, wherein said one or more sensors comprise a first inclinometer and a first accelerometer; and wherein said first processor is further adapted to:
      receive a first inclination signal from said first inclinometer wherein said inclination signal indicates the inclination of the floating wind turbine in said fore-aft direction;
      receive a first acceleration signal from said first accelerometer wherein said acceleration signal indicates an acceleration of said floating wind turbine in said fore-aft direction; and determine said fore-aft inclination signal based on said received first inclination signal and said first acceleration signal by:
    multiplying said first acceleration signal by a first constant gain; and
    subtracting said first acceleration signal multiplied by said first constant gain from said first inclination signal;
a second processor adapted to receive a side-to-side inclination signal from said one or more sensors, wherein said side-to-side inclination signal indicates an inclination of said floating wind turbine in a side-to-side direction, wherein said one or more sensors comprise a second inclinometer and a second accelerometer, and wherein said second processor is further adapted to:
    receive a second inclination signal from said second inclinometer wherein said second inclination signal indicates an inclination of the floating wind turbine in said side-to-side direction;
    receive a second acceleration signal from said second accelerometer wherein said second acceleration signal indicates an acceleration of said floating wind turbine in said side-to-side direction; and
    determine said side-to-side inclination signal based on said received second inclination signal and said second acceleration signal by:
        multiplying said second acceleration signal by a second constant gain;
    and
        subtracting said second acceleration signal multiplied by said second constant gain from said second inclination signal; and
a third processor adapted to alter an operational parameter of said floating wind turbine based on either or both of said fore-aft inclination signal and said side-to-side inclination signal.

7. The floating wind turbine as claimed in claim 6 further comprising:
a fourth processor adapted to compare said fore-aft inclination signal and/or said side-to-side inclination signal to a predefined threshold; and
said third processor is further adapted to alter said operational parameter of said floating wind turbine if said fore-aft inclination signal and/or said side-to-side inclination signal is greater than said predefined threshold.

8. The floating wind turbine as claimed in claim 6 further comprising:
a fifth processor adapted to determine an overall inclination signal for said floating wind turbine based on said fore-aft inclination signal and said side-to-side inclination signal;
a sixth processor adapted to compare said overall inclination signal for said floating wind turbine to a predefined threshold; and
said third processor is further adapted to alter said operational parameter of said floating wind turbine if said overall inclination signal is greater than said predefined threshold.

9. The floating wind turbine as claimed in claim 6 in which said third processor alters said operational parameter of said floating wind turbine by initiating a shutdown of said floating wind turbine.

10. The floating wind turbine as claimed in claim 6 further comprising:

a seventh processor adapted to determine said first and second constant gains based on one or more of predicted conditions affecting said floating wind turbine, actual conditions affecting said floating wind turbine and historical conditions affecting said floating wind turbine.

11. A computer program product comprising:
a non-transitory computer-readable storage medium having computer readable program code embodied therewith, wherein the computer readable program code executable by a processor causes the processor to:
    receive a fore-aft inclination signal from a sensor, wherein said fore-aft inclination signal indicates an inclination of a floating wind turbine in a fore-aft direction, wherein said sensor comprises a first inclinometer and a first accelerometer; and wherein the computer readable program code further causes the processor to:
        receive a first inclination signal from said first inclinometer wherein said inclination signal indicates the inclination of the floating wind turbine in said fore-aft direction;
        receive a first acceleration signal from said first accelerometer wherein said acceleration signal indicates an acceleration of said floating wind turbine in said fore-aft direction; and
        determine said fore-aft inclination signal based on said received first inclination signal and said first acceleration signal by:
            multiplying said first acceleration signal by a first constant pain; and
            subtracting said first acceleration signal multiplied by said first constant gain from said first inclination signal;
    receive a side-to-side inclination signal from said sensor, wherein said side-to-side inclination signal indicates an inclination of said floating wind turbine in a side-to-side direction, wherein said sensor comprises a second inclinometer and a second accelerometer, and wherein the computer readable program code further causes the processor to:
        receive a second inclination signal from said second inclinometer wherein said second inclination signal indicates an inclination of the floating wind turbine in said side-to-side direction;
        receive a second acceleration signal from said second accelerometer wherein said second acceleration signal indicates an acceleration of said floating wind turbine in said side-to-side direction; and
        determine said side-to-side inclination signal based on said received second inclination signal and said second acceleration signal by:
            multiplying said second acceleration signal by a second constant
    gain; and
        subtracting said second acceleration signal multiplied by said second constant gain from said second inclination signal; and
    alter an operational parameter of said floating wind turbine based on either or both of said fore-aft inclination signal and said side-to-side inclination signal.

* * * * *